United States Patent [19]

Dresher

[11] Patent Number: 5,228,030
[45] Date of Patent: Jul. 13, 1993

[54] TIME DIVISION COMMUNICATION SYSTEM FRAME CHANGEOVER ARRANGEMENT

[75] Inventor: Kevin M. Dresher, Bernards Township, Somerset County, N.J.

[73] Assignee: AT&T Bell Laboratories, Murray Hill, N.J.

[21] Appl. No.: 429,888

[22] Filed: Oct. 31, 1989

[51] Int. Cl.$^5$ .................................................. H04J 3/06
[52] U.S. Cl. .................................. 370/100.1; 375/108
[58] Field of Search ................... 371/20.1, 55, 56, 5.5, 371/47.1; 375/106, 108; 370/100.1, 13, 17, 102, 103, 104.1, 105, 105.1, 105.2, 105.3, 105.4, 105.5, 77, 47, 49

[56] References Cited

U.S. PATENT DOCUMENTS

| | | | |
|---|---|---|---|
| Re. 33,900 | 4/1992 | Howson | 375/108 |
| 4,125,745 | 11/1978 | Steidl | 179/15 |
| 4,271,509 | 6/1981 | Brolin | 370/110 |
| 4,316,284 | 2/1982 | Howson | 375/47.1 |
| 4,316,285 | 2/1982 | Bobilin et al. | 371/47.1 |
| 4,397,020 | 8/1983 | Howson | 370/105 |
| 4,653,043 | 3/1987 | Brady et al. | 370/13 |
| 4,841,526 | 6/1989 | Wilson et al. | 371/32 |
| 4,882,727 | 11/1989 | Williams et al. | 370/102 |
| 4,924,460 | 5/1990 | Lubarsky et al. | 370/110.1 |
| 4,979,169 | 12/1990 | Almond et al. | 370/105.1 |
| 5,051,979 | 9/1991 | Chaudhuri et al. | 370/16 |
| 5,138,616 | 8/1992 | Wagner, Jr. et al. | 371/5.5 |

OTHER PUBLICATIONS

*AT&T Bell Laboratories Technical Journal*, vol. 63, No. 10, Part 2, Dec. 1984, "The SLC-96 Subscriber Loop Carrier System" edited by R. C. Chapman, Jr., pp. 2273-2437.

Primary Examiner—Douglas W. Olms
Assistant Examiner—Shick Hom
Attorney, Agent, or Firm—Lester H. Birnbaum

[57] ABSTRACT

A frame organized time division multiplex communication system includes a central office and at least one remote terminal. A time division link connected between each remote terminal and the central office carries signals organized in time division multiplex frames. The central office determines the time division multiplex link frame format. Each remote terminal has at least one interface connected to the time division link that multiplexes signals into the time division multiplex frames, demultiplexes signals from the time division multiplex frames and monitors the time division frames from the time division link for in-frame and out-of-frame operation. An interface controller in the remote terminal determines the frame configuration of the interface multiplexing and demultiplexing. The controller identifies interfaces exhibiting out-of-frame operation and automatically switches the identified out-of-frame interfaces to an alternate frame configuration. The remote terminal frame configuration is thereby adjusted to correspond to a change in time division link frame format.

17 Claims, 10 Drawing Sheets

TIME DIVISION COMMUNICATION SYSTEM FRAME CHANGEOVER ARRANGEMENT

FIELD OF THE INVENTION

The invention relates to framing arrangements for time division communication systems and, more particularly, to modifying frame configurations in time division communication terminals.

BACKGROUND OF THE INVENTION

As is well known, time division multiplex (TDM) permits a large number of subscribers to be connected to a central communication facility over a single communication path. In telephone systems, the connection between a central office and an individual subscriber has generally been made by a single twisted pair subscriber loop between the central office and the subscriber. Where many subscribers are in the vicinity of a location remote from the central office, it is uneconomical to provide each with a separate subscriber loop. By placing a time division link between a central office and a remote terminal in the vicinity of a group of subscribers, it is possible to eliminate many of the individual subscriber loops. The time division link thereby achieves greater economy, improved capacity and also increases flexibility in the services provided to the subscribers.

Transmission of signals by time division multiplex is accomplished by sampling the information signals from a number of sources at a prescribed rate, converting each sample into a digital code and combining the individual digital codes for transmission over the time division link. Each digital code is assigned a time slot position in a predefined time frame and the information is conveyed in the sequence of frames sent over the link. When received, the digital codes of the individual time slots are separated according to the predefined frame and distributed to the intended destinations. Time division frames may be defined in many ways as long as the selected frame configuration follows the fundamental multiplexing principles. It is essential, however, that both ends of the time division link have the same frame configuration and that the frame processing be synchronized. Otherwise, the information signals cannot be properly organized and distributed.

U.S. Pat. No. 4,125,745 issued to R. E. Steidl, Nov. 14, 1978, discloses a method and apparatus for framing in a time division multiplex communication system in which frame synchronization that avoids reframing on a non-frame bit temporarily containing a preset framing pattern by monitoring for the presence of a repetitive pattern whenever a status signal indicates the absence of frame synchronization. A separate message communication link provided for exchange of system information. The arrangement requires that the framing be predefined and non-changing.

U.S. Pat. No. 4,841,526 issued to J. C. Wilson et al, Jun. 20, 1989, discloses a data communication system in which the size of the time division frame is varied according to the speed, length or error rate to maximize the utilization of the communication link. While the frame size may be adjusted, other parameters defining the frame configuration cannot be changed without disrupting communications.

In many time division multiplex communication systems such as digital loop carrier arrangements, it is often necessary to modify the parameters governing the time division frame configuration. The changes necessitate modifications of all terminals of the time division link. The modifications in a digital loop carrier system made at a central office, however, disrupt communication to the other terminals of a system. Unless the framing configuration of the remote terminal is changed, the terminal is not able to process any information. Thus, it is not possible to communicate the framing changes to the remote terminals over the time division multiplex link unless the system is arranged so that frame change information can be sent priorly or there is an independent communication path adapted to convey such information. Prior transmission of frame change information, however, must be accurately synchronized with the change in frame configuration. Otherwise, there will be a time period during which all signal exchange between the central office and the remote terminal will be disrupted.

In the absence of an independent communication path for transfer of terminal configuration information, physical access to the terminals of the system is required. Often, physical access is not possible as in satellite terminals or is too costly as in digital loop multiplex systems with many remotely located terminals. It is an object of the invention to provide improved frame changeover in a time division communication system so that framing parameters may be altered without the need for physical access to all terminals or the use of a communication link in addition to the information conveying time division link.

BRIEF SUMMARY OF THE INVENTION

The foregoing object is achieved by an arrangement that responds to an out-of-frame condition at a terminal of a time division multiplex communication system for an extended period by automatically modifying the terminal framing parameters. If the parameter change results in proper framing, the modified terminal parameters are retained.

The invention is directed to a frame organized time division multiplex communication system in which a plurality of terminals exchange information over a time division link. Each terminal includes at least one interface to the time division link and a controller that selects the frame configuration parameters of the interface. The controller responds to out-of-frame operation reported by the interface by modifying the frame configuration parameters of at least one interface.

According to one aspect of the invention, the controller monitors the modified interface for in-frame operation. Upon detection of an in-frame condition after a prescribed time interval, the terminal interfaces are switched to the modified frame configuration parameters.

In one embodiment of the invention, the central office of a frame organized time division multiplex communication system is connected to at least one remotely located terminal serving a plurality of subscribers through at least one time division link. Each remote terminal has at least one interface coupling the time division link to one group of the plurality of subscribers. The interface multiplexes signals from the group of subscribers onto the time division frames, demultiplexes signals received from the time division frames, distributes the demultiplexed signals to the one group of subscribers and monitors the in-frame and out-of-frame operating condition of the interface. An interface controller in the remote terminal determines when the operating interfaces exhibit out-of-frame operation. The controller then switches the operating interfaces to an alternate frame configuration. All interfaces of the remote terminal are switched to the alternate frame configuration responsive to at least one alternate frame configuration interface exhibiting in-frame operation.

DETAILED DESCRIPTION

Figure 1:
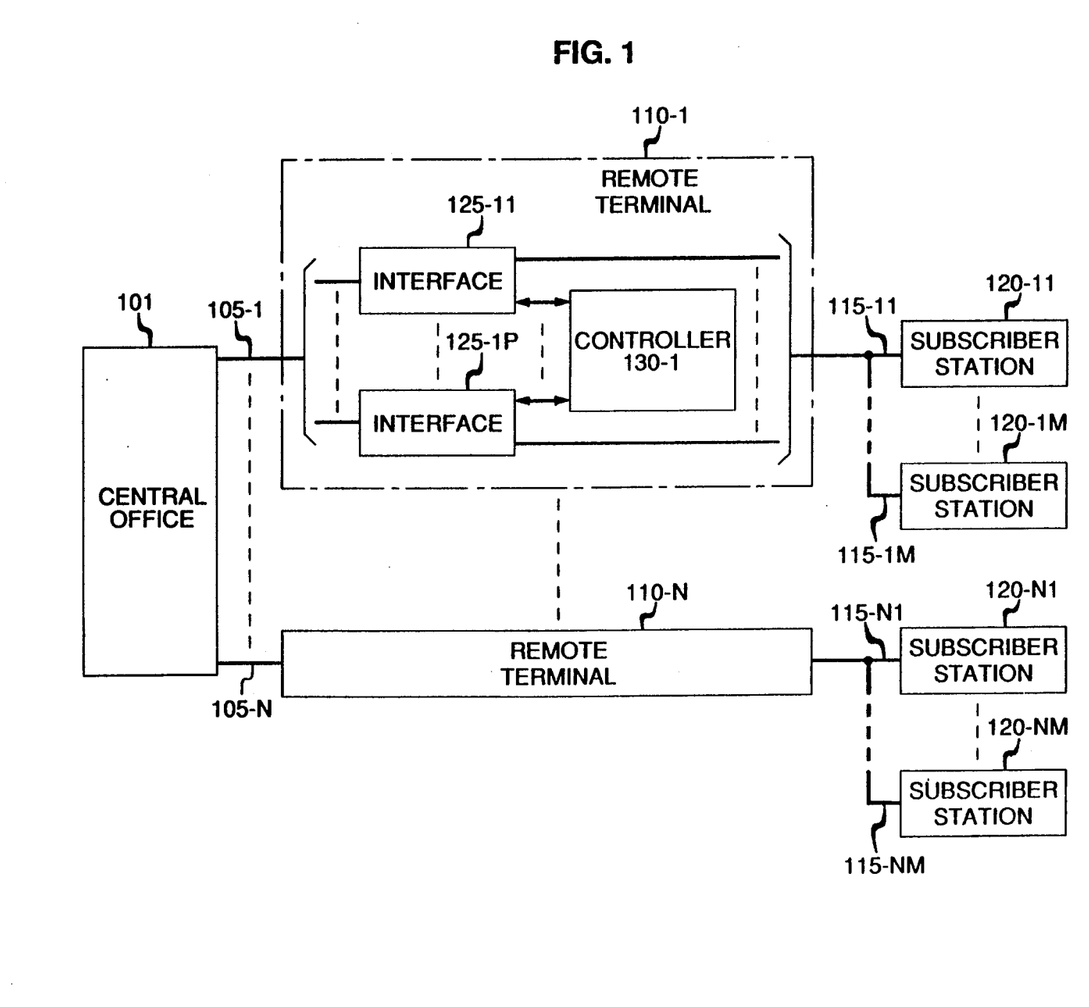
FIG. 1 depicts a general block diagram of a time division multiplex communication system including a central office and a plurality of remote terminals illustrative of the invention.

FIG. 1 shows a general block diagram of a digital loop carrier system in which a central office 101 is connected to remote terminals 110-1 through 110-N through time division multiplex links 105-1 through 105-N. Each link may comprise one or more time division multiplex lines. Remote terminal 110-1 is further connected to M subscriber stations 120-11 through 120-1M via short subscriber lines 115-11 through 115-1M. Similarly, remote terminal 110-N is further connected to M subscriber stations 120-N1 through 120-NM via subscriber lines 115-N1 through 115-NM. Each remote terminal includes a controller, e.g., 130-1, adapted to control the operations of the terminal and its interfaces. The interface, e.g., 125-11, is adapted to convert received time division multiplexed signals from link 105-1 into separate signals to be sent to a group of subscriber stations and to multiplex the subscriber station signals onto link 105-1. Controller 130-1 monitors the operation of the interfaces and provides frame configuration signals thereto.

Information exchanged between the central office and a remote terminal is organized in successive time frames. In the frame format on link 105-1, for example, each frame may be the T1 carrier bipolar type well known in the art having 193 bits consisting of 24 eight bit words and one framing bit at a 1.54 mbs rate. Each eight bit word corresponds to a single channel that exchanges information between a subscriber station and the central office. For one type of framing, for example, Fs, a sequence of 12 frames may form a super frame. The super frame has supervisory signaling bits and synchronizing bits necessary for system operation embedded therein in a prescribed pattern. Alternatively, a super frame of the Fe type comprises a sequence of 24 frames having a different pattern of embedded supervisory signaling, data link bits and frame synchronizing bits. The insertion of supervisory signaling generally involves pulse borrowing in which a bit in selected time slots is utilized to transmit supervisory signals to the associated subscriber channels. In order to process time frame information, it is necessary to maintain the same frame configuration parameters in the central office and in the remote terminals.

Central office 101 and each remote terminal includes apparatus that defines the framing configuration to appropriately process information signals. In the event that the framing configuration is altered in the central office to accommodate more subscribers or to improve information processing, communication with the remote terminals is disrupted until the frame configurations of the remote terminals are switched to the altered framing. In many digital loop systems, all signaling is transferred from the central office to the remote terminals over the time division links therebetween to minimize cost and to improve service. Such systems have required direct physical access to effect modification of framing in the remote terminals. According to the invention, control apparatus in each remote terminal detects the occurrence of a prolonged out-of-frame condition and temporarily switches to an alternate frame configuration. If in-frame operation is thereafter detected, the reconfiguration is made permanent. Otherwise the original configuration is reestablished and an alarm signal is issued.

Figure 2:
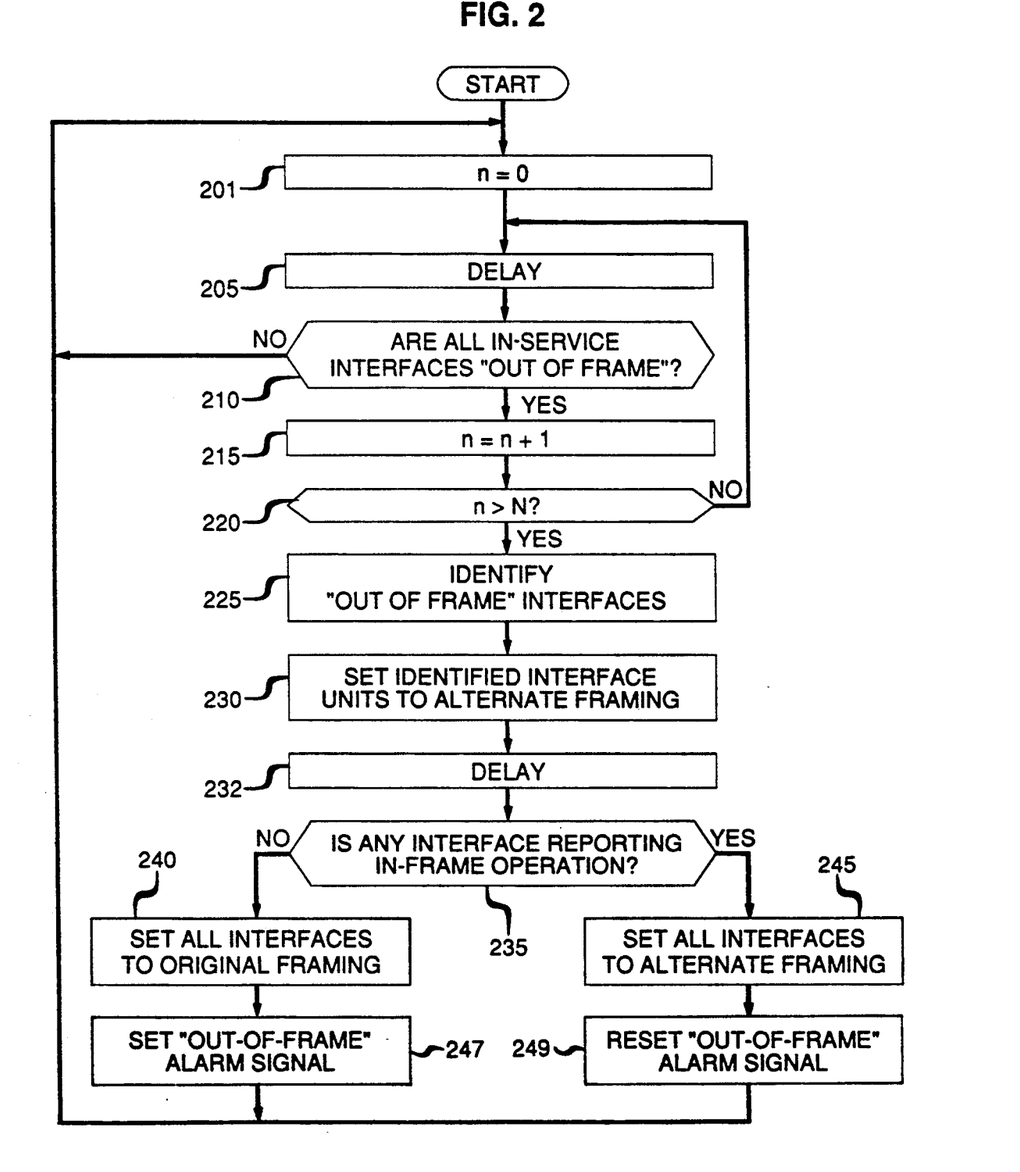
FIG. 2 is a flowchart illustrating the operation of the frame change over arrangements in a remote terminal of FIG. 1.

FIG. 2 is a flowchart illustrating the frame reconfiguration operations provided by the controllers of FIG. 1. Out-of-frame index n is initially set to 0 in step 201 and operation shown in the flowchart is halted for a predetermined time as per delay step 205. The framing status of the in-service interfaces in the remote terminal are polled (step 210). If all the in-service interfaces exhibit out-of-frame operation, out-of-frame index n is incremented (step 215) and step 205 is reentered via decision step 220. Otherwise, step 201 is reentered and the delay index is reset.

In the event that all in-service interfaces are out-of-frame when the out-of-frame index exceeds a predetermined number N, step 225 is entered in which controller, e.g., 130-1, marks all out-of-frame interfaces. The frame configuration parameters in the identified interfaces are then set to prescribed alternate framing values (step 230). Further operation shown in FIG. 2 is delayed (step 232) so that the marked interfaces may operate with the altered framing. Step 235 is then entered in which the identified interfaces are polled for in-frame operation. In the event that at least one identified interface exhibits in-frame operation, all interfaces of the remote terminal are set to the alternate framing configuration (step 245). An out-of-frame alarm signal is then reset in step 249. If no interface reports framed input in step 235, the interfaces are reprovisioned with the original framing parameters (step 240) and the out-of-frame alarm is set in step 247. The controllers of FIG. 1 thereby provide automatic cut-over from one frame configuration to another when a change in the framing is made at the central office. Physical access to the remote terminals of the system to accomplish framing changes is thereby avoided without an additional communication path.

Figure 3:
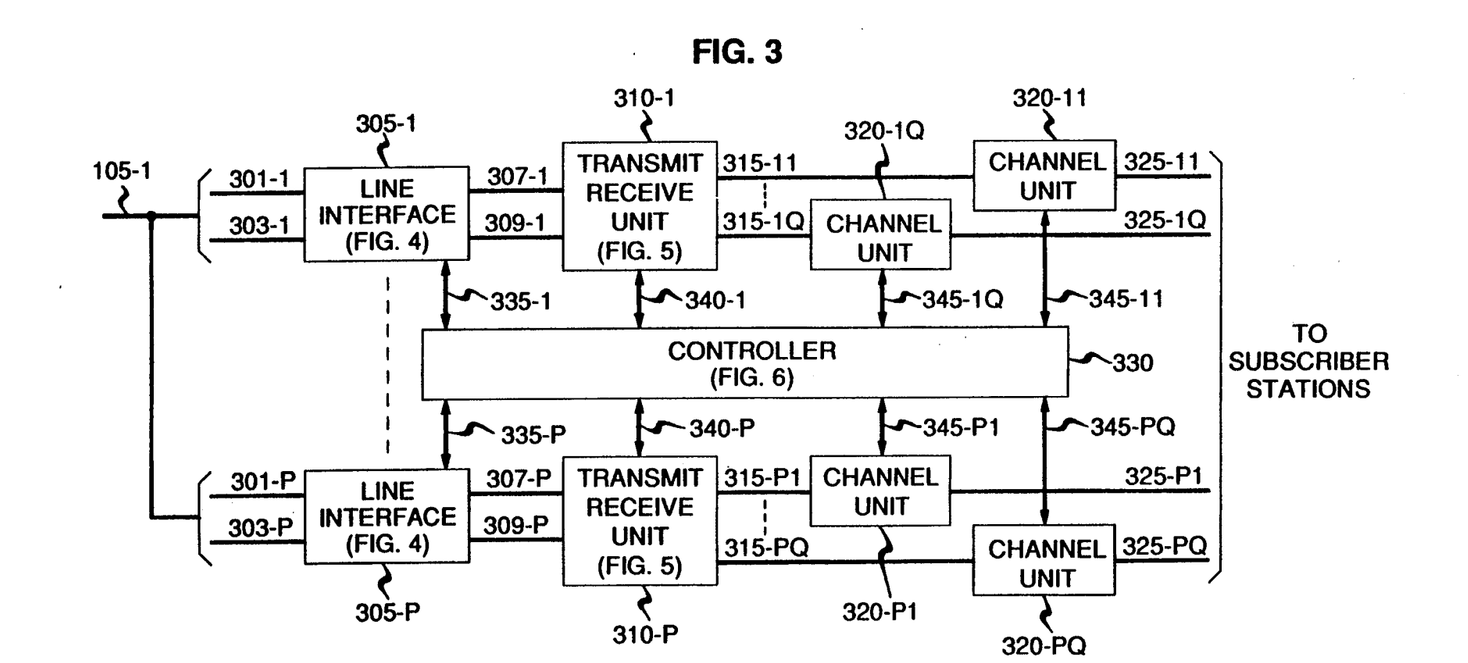
FIG. 3 depicts a more detailed block diagram of a remote terminal in the system of FIG. 1.

FIG. 3 is a more detailed block diagram of a remote terminal of the digital loop carrier system of FIG. 1. Referring to FIG. 3, the remote terminal therein comprises a group of line interface units 305-1 through 305-P, a group of transmit and receive units 310-1 through 310-P, a set of channel units associated with each transmit-receive unit, e.g., channel units 320-11 through 320-1Q associated with transmit receive unit 310-1, and a controller 330. Each line interface unit, e.g., 305-1, supplies PCM signals in bipolar T1 time division frame format to transmit TDM line 301-1 and receives bipolar T1 time division formatted PCM signals from receive TDM line 303-1. Interface 305-1 is also connected to transmit and receive unit 310-1 by transmit TDM line 307-1 and receive TDM line 309-1. Interface 305-1 converts the time division frame signals from line 307-1 to T1 frame signals and transforms the T1 time division frame signals from line 303-1 to time division frame signals acceptable by transmit-receive units 310-1.

Channel units 320-11 through 320-1Q are coupled to transmit-receive unit 310-1 via lines 315-11 through 315-1Q and connect to subscriber stations via lines 325-11 through 325-1Q. With respect to data received from line interface 305-1, transmit-receive unit 310-1 separates the time division multiplex frames received from line interface unit 305-1 and distributes the channel information to the individual channel units. Information from the channel units are multiplexed and formatted into a time division frame which is sent to the line interface unit.

Controller 330 is adapted to control the configuration and operation of the separate units in FIG. 3 and communicates with each of the separate units through a serial bus. Line interface 305-1 is connected to the controller by bus 335-1. Transmit-receive unit 310-1 is connected to the controller by bus 340-1. The channel units 320-11 through 310-1Q associated with transmit-receive unit 310-1 are connected via buses 345-11 through 345-1Q, respectively. The general arrangement and operation of a digital loop multiplex system is described in the articles in the "The SLC-96 Subscriber Loop Carrier System" edited by R. C. Champer, Jr. appearing in *The AT&T Bell Laboratories Technical Journal*, Vol. 63, No. 10, Part 2, December, 1984, pp. 2273-2437.

Figure 4:
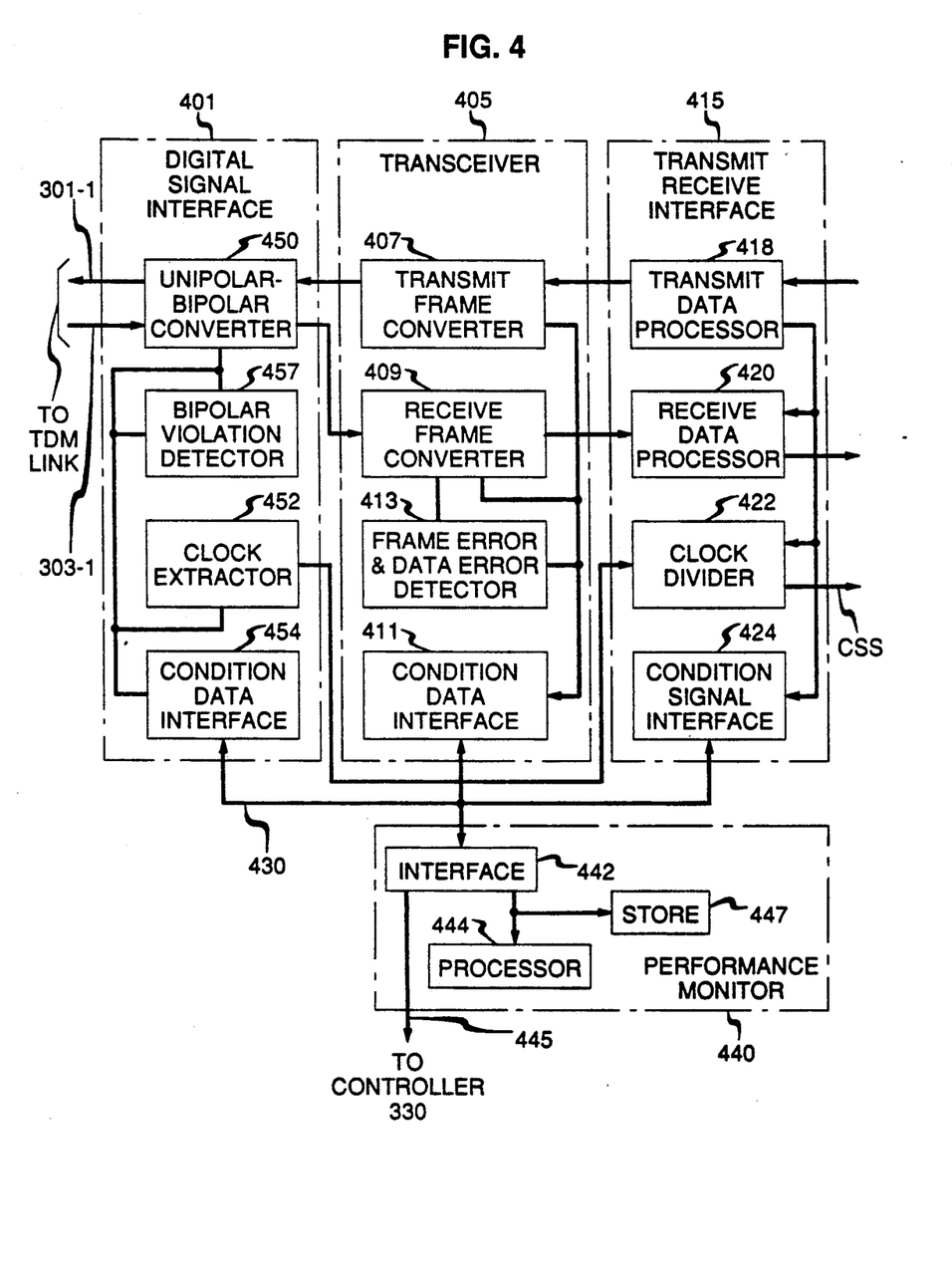
FIG. 4 shows a more detailed block diagram of the line interface unit of FIG. 3.

Line interface unit 305-1 is shown in greater detail in FIG. 4. The circuit of FIG. 4 includes digital signal interface 401, transceiver 405, transmit-receive interface 415, and performance monitor 440. Digital signal interface 401 connected between time division lines 301-1 and 303-1 and transceiver 405 processes the received time division signal frames to extract clocking information, detects loss of clock, loss of signal and bipolar violations. It also processes the time division signal frames from transceiver 405 to insert certain signals into the time division frames applied to time division line 301-1. It also provides transmit signal equalization and special signal encoding.

Digital signal interface 401 comprises unipolar to bipolar converter 450 which converts the unipolar time division frame signals received from transceiver 405 into bipolar signals to be applied to time division line 301-1, and transforms bipolar signals received from time division line 303-1 to unipolar signals to be applied to the transceiver. In processing signals to be applied to time division line 301-1, converter 450 provides signal equalization. In processing signals received from time division line 303-1, bipolar violations are detected in detector 457. Clock extractor 452 is adapted to generate a clock signal for the remote terminal from the time division signals being processed for application to transceiver 405. The data indicative of the signal conditions in converter 450, bipolar violation detector 457 and clock extractor 452 are monitored and sent to condition data interface 454.

Transceiver 405 connected between digital signal interface 401 and transmit-receive interface 415 includes transmit frame converter 407, receive frame converter 409, frame and data error detector 413 and condition signal interface 411. Transmit frame converter 407 modifies the framing format and the frame rate of the time division frames received from the transmit-receive unit into the format and rate employed on time division line 301-1. Receive frame converter transforms the frame format and rate used on time division line 303-1 into the format and rate required by the transmit and receive unit. In changing the frame format, the converters perform zero code suppression encoding and decoding as required.

Transmit frame converter 407 and receive frame converter 409 are adapted to modify framing configurations to accommodate the framing arrangement set by central office 101. Frame and data error detector 413 is adapted to detect framing errors and an "all ones" error condition in the frame signals applied to receive frame converter 409. Condition interface 411 stores data condition signals from converters 407 and 409 and conditioning instruction signals from performance monitor 440.

Transmit and receive interface 415 connected between transceiver 405 and transmit and receive unit 310-1 performs the necessary pre-processing and post-processing on the data received from and sent to transceiver 405 so that the data is compatible with the operations of the transceiver and the transmit and receive unit. The pre- and post-processing is performed in transmit data processor 418 and receive data processor 420. Clock divider 422 generates a clock phasing signal for transmit and receive unit 310-1 from the clock recovered by clock extractor 452 in digital signal interface 401. The clock phasing signal from interface 415 is used by the transmit and receive unit to phase lock the recovered clock thereby providing a clock signal for the remote terminal.

Performance monitor 440 provides the communication link between the line interface of FIG. 4 and controller 330. It receives data condition signals from interface 454 of data signal interface 401, interface 411 of transceiver 405 and interface 424 of transmit and receive interface 415 via interface bus 430, monitors data condition signals generated by the units of the line interface circuit and sends data signals to interfaces of these units. Monitor 440 includes interface 442 connected to bus 430, processor 444, and store 447. The data condition signals received from bus 430 are stored in memory 447 and are accessed through bus 445 by controller 330. Provisioning signals from controller 330 are stored in memory 447 and transferred to interfaces 454, 411 and 424 under control of processor 444.

Figure 5:
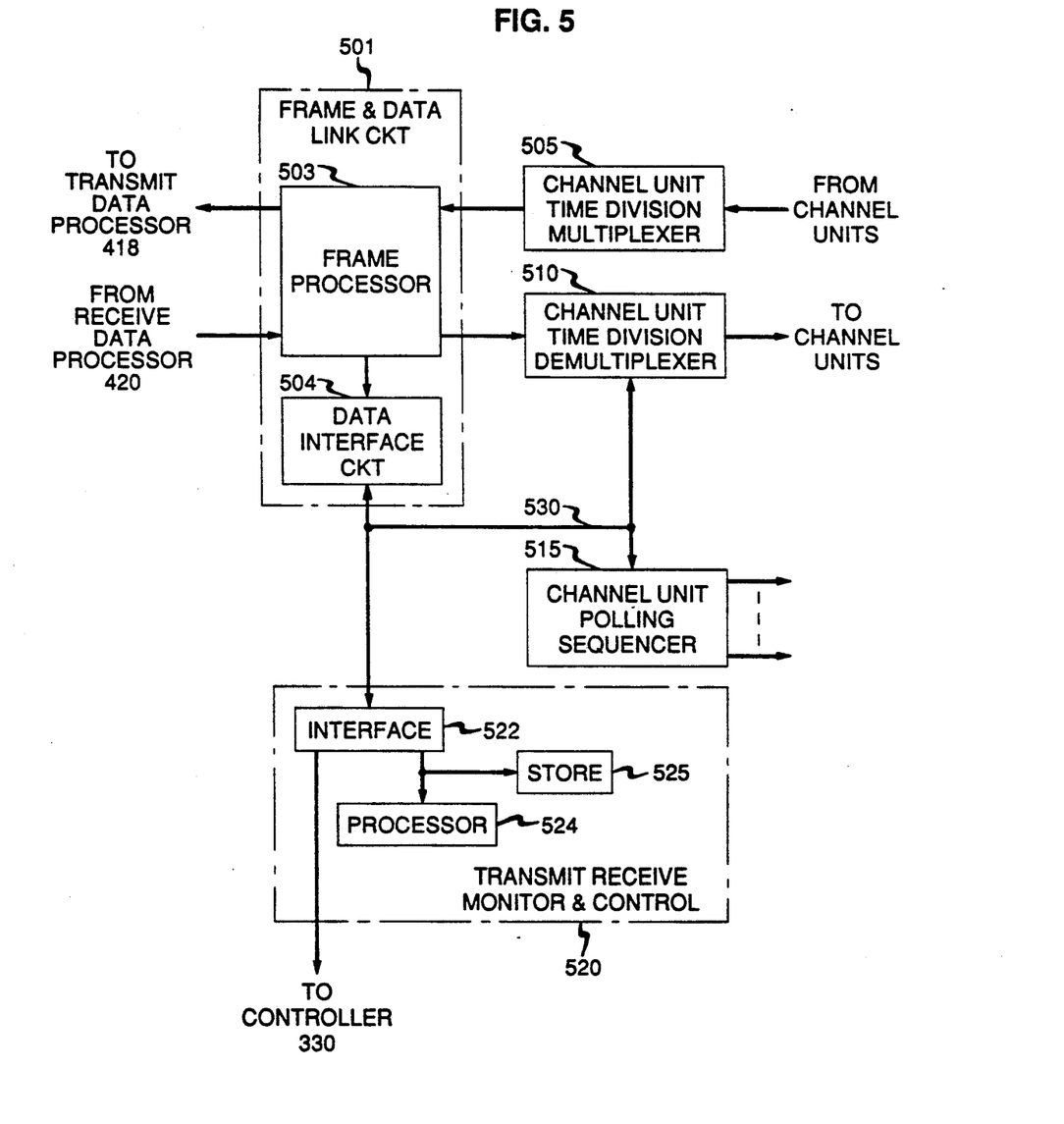
FIG. 5 shows a more detailed block diagram of the transmit-receive unit of FIG. 3.

Transmit-receive unit 310-1 shown in greater detail in FIG. 5 includes framing and data link circuit 501, channel unit time division multiplexer 505, time division demultiplexer 510, channel unit polling sequencer 515 and transmit-receive monitor and control circuit 520. Referring to FIG. 5, framing and data link circuit 501 receives PCM coded information, signaling data for each channel and control data related to the operation of the remote terminal in each time division frame from line interface 305-1. The channel information and signaling data is reframed for distribution to the channel units via channel unit demultiplexer 510. System control data is extracted from the time division frame signals received from line interface 305-1 at a low bit rate, e.g., 4 kbs. The extracted control data is sent to remote terminal controller 330 via monitor and control circuit 520.

Frame and data link circuit 501 comprises frame processor 503 and data interface 504. Control data sent from controller 330 via transmit-receive monitor 520 is applied to frame processor via data interface circuit 504. Frame processor 503 combines the channel data from multiplexer 505 with data signals from controller 330 into a time division frame format which is sent to interface 305-1. Processor 503 extracts the data signals from the time division frames applied thereto and sends the channel data in the time division frames to demultiplexer 510. Interface 504 receives data extracted from time division frames in frame processor 503 for transfer to controller 330.

Channel unit time division multiplexer 505 receives channel data, channel supervisory signals and control signals from the channel units 120-11 through 120-1M served by transmit-receive unit 310-1 and multiplexes the received channel signals into a PCM data stream. The data stream is applied to framing and data link circuit 501 which forms transmit time division frames. Channel unit time division demultiplexer 510 separates the time division frame channel data from framing and data link circuit 501 and supplies the individual channel PCM signals to the individual channel units served by transmit-receive unit 310-1. Channel unit polling sequencer 515 sequentially enables the channel units to exchange data with multiplexer 505 and demultiplexer 510. The polling sequencer includes a channel unit counter that supplies selection signals to the channel units in a predetermined order set by the frame polling configuration. Transmit and receive monitor and controller 520 transfers status and control signals between controller 330 and framing and data link circuit 501, channel unit multiplexer 505, channel unit demultiplexer 510 and channel unit polling sequencer 515 via interface bus 530 and provides an intermediate store for the status and control information. It includes interface 522 connected to bus 530, processor 524 to control data conditioning and transfer and store 525 which stores transmit receive unit provisioning and condition signals.

Figure 6:
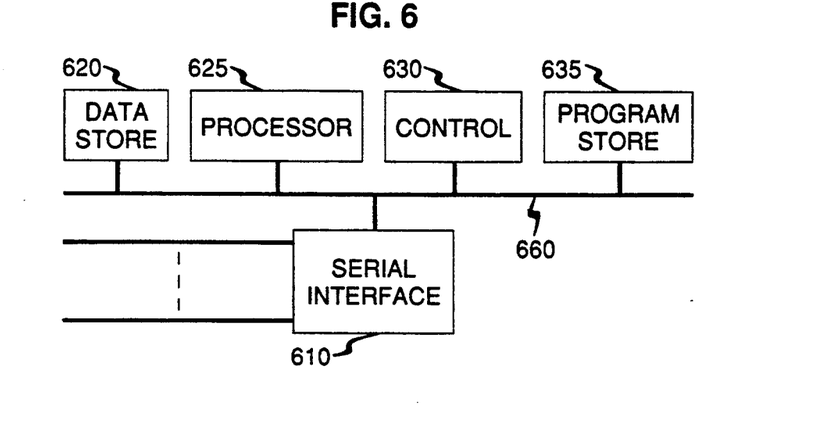
FIG. 6 shows a more detailed block diagram of the controller of FIG. 3.

Controller 330 is shown in greater detail in FIG. 6 and may comprise a processing arrangement including the Motorola type 680008 microprocessor well known in the art. Referring to FIG. 6, the controller comprises processor 625, data store 620, program store 635, control 630 and serial interface 610. It is operative to control the remote terminal operating units including line interfaces 305-1 through 305-P, transmit-receive units 310-1 through 310-P and the channel units connected to the transmit-receive units. Serial interface 610 is connected to each line interface, transmit-receive unit and channel unit via a serial bus. Line interface 305-1, for example, exchanges control and data signals over bus 335-1.

Data applied to interface 610 from the serial interface buses include unit status, alarm and test condition signals which enable controller 330 to evaluate the condition of the remote terminal. Data from controller 330 is applied via the interface buses to the remote terminal operating units to set operating and framing parameters, control testing of the operating units and to switch operating units in or out based on status signals. Data is exchanged between central office 101 and controller 330 via the time division link therebetween. Central office data signals encoded on the time division frames are separated therefrom in framing and data link circuit 501 of the transmit-receive unit shown in FIG. 5. Data signals from controller 330 are sent to framing and data link circuit 501 via interface bus 340-1 and transmit-receive monitor and control 520. The data is then encoded onto the time division frames in framing and data link circuit 501 for transmission to the central office. Program store contains permanently stored instructions controlling the operations of controller 330 including a set of instruction codes that modifies the framing configuration of the remote terminal to conform to the frame configuration of central office 101.

Assume for purposes of illustration that the data exchanged over the time division link between the central office and the remote terminals of FIG. 1 comprises bipolar data signals transmitted in the well known T1 time division frame format at a rate of 1.54 mbs. As aforementioned, the T1 time division frame consists of 24 eight bit time slots and a framing bit carrying PCM coded data for 24 channels as well as channel signaling and other link data. While the T1 time division frame has a preset pattern, there are several framing arrangements that may be used in digital loop carrier systems. In one framing arrangement (Fs), a sequence of 12 T1 frames forms a super frame. An alternate framing arrangement (Fe) combines a sequence of 24 T1 frames into a super frame. In each framing arrangement, data link information is encoded at a much lower bit rate (e.g., 4 kbs) in framing bits of the time division frames of the super frame sequence.

Line interface 305-1 of FIG. 3 is coupled to the central office through time division lines 301-1 and 303-1. Line 301-1 transfers data signals in the bipolar T1 frame format to the central office while line 303-1 receives data signals in the bipolar T1 frame format from the central office. If Fs type framing is used, line interface 305-1 converts the bipolar 24 time slot 1.54 mbs T1 frame from line 303-1 into a 4.096 mbs rate 32 time slot unipolar time division frame shown in FIG. 7. Waveform 701 illustrates the bit arrangement of one channel time slot in the frame of 32 time slots shown in waveform 705. Waveform 710 illustrates a super frame comprising a sequence of 12 time division frames of waveform 705. With Fe type framing, each sequence of 24 frames forms the super frame shown in waveform 715.

Figure 7:
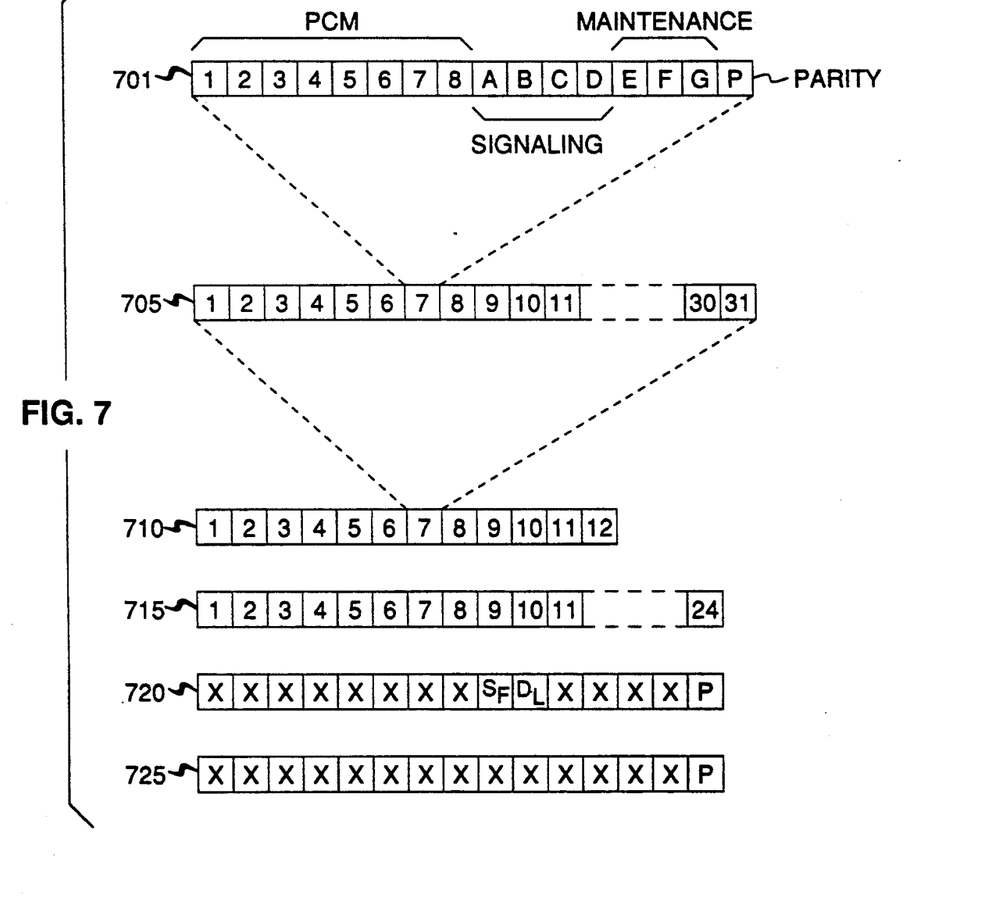
FIG. 7 illustrates the frame arrangements used in the system of FIG. 1.

Referring to FIG. 7, each time slot has 16 bit positions. Bits 1 through 8 of channel time slot waveform 701 form a PCM code representing the voice sample or data information of the channel. Bits A, B, C and D are channel supervisory signaling bits. Bits E, F and G are channel maintenance bits used within the remote terminal to control channel unit operation and bit P is the channel parity bit. The T1 time division frame has 24 time slots to serve 24 channels. Signaling bits are inserted into the channel PCM bits as described in U.S.

Pat. No. 4,271,509 issued to S. J. Brolin, Jun. 2, 1981, and data link bits are inserted into the framing bit positions of selected time division frames.

Line interface 305-1 receives the bipolar T1 time frames and converts each frame into a 32 time slot unipolar frame, e.g., Fs frames. Each Fs type frame has 32 time slots 24 of which are assigned to channels. Seven of the eight remaining time slots are null time slots arranged as shown in waveform 725. Time slot zero in the Fs frame shown in waveform 720 has a super frame defining bit, a data link bit and a parity bit. The Fs frames received by transmit-receive unit 310-1 are processed in frame and data link circuit 501 to transfer the channel information bearing frames to channel unit demultiplexer 510 and to extract the data link bits from each super frame for transfer to controller 330. In the reverse direction, frame and data link circuit 501 receives multiplexed channel data. Data link information is combined with the multiplexed channel information to form the Fs frame.

Fs framing generally uses bipolar violation error detection to determine framing and data errors, uses only A and B signaling bits for on-hook off-hook and ringing detection and has a data link with a predefined bit field for bit oriented messaging. In contrast to Fs framing, the Fe frame format has a super frame consisting of 24 successive frames, uses variable error threshold cyclic redundancy checking as well as bipolar violation error checking, uses A, B, C and D signaling bits and has a message oriented data link bit pattern. Further, the channel sequencing in Fs framing uses interspersed channel sequencing for cross-talk reduction while Fe framing uses direct channel sequencing. Consequently, Fs framing is incompatible with Fe framing. As a result of the differences between Fs and Fe framing, a remote terminal having one type of frame configuration cannot communicate with a central office having the other type frame configuration, and a change in central office frame configuration necessitates changing the framing configuration of the remote terminals connected thereto.

Figure 8:
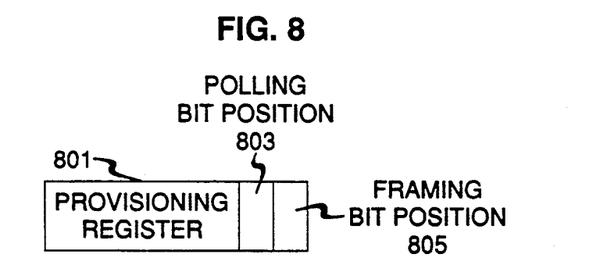
FIG. 8 shows the provisioning register configuration of the interface unit of FIG. 4.
Figure 9:
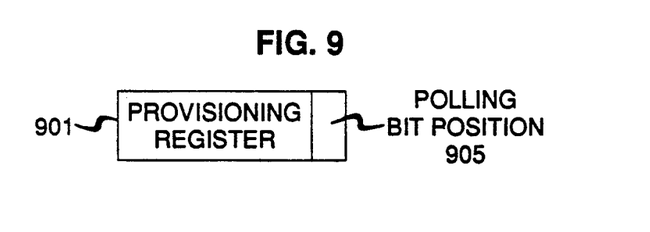
FIG. 9 shows the provisioning register configuration of the transmit-receive register of FIG. 5.

The remote terminal of FIG. 3 includes provisioning registers in both the line interface and the transmit-receive units. The provisioning register of line interface 305-1 is included in store 447 of performance monitor 440. The provisioning register of transmit-receive unit 310-1 is included in store 525 of transmit-receive monitor and control 520. Store 447 of interface 305-1 also includes a status register in which frame error conditions are stored. FIG. 8 shows provisioning register 801 of the performance monitor of FIG. 4. Bit position 803 controls the channel sequencing which may be the D1D type of the Fs frame configuration or the D4 type of the Fe frame configuration. Bit position 805 controls the framing configuration of the interface which may be set for Fs or Fe framing. The provisioning register of the transmit-receive unit of FIG. 5 is shown as register 901 of FIG. 9. Register 901 includes a polling bit position which determines the operation of channel unit polling sequencer 515. If the bit is in one state, the polling sequencer performs D1D interspersed channel sequencing. In response to the opposite type polling bit, sequencer 515 performs D4 direct channel sequencing.

Figure 10:
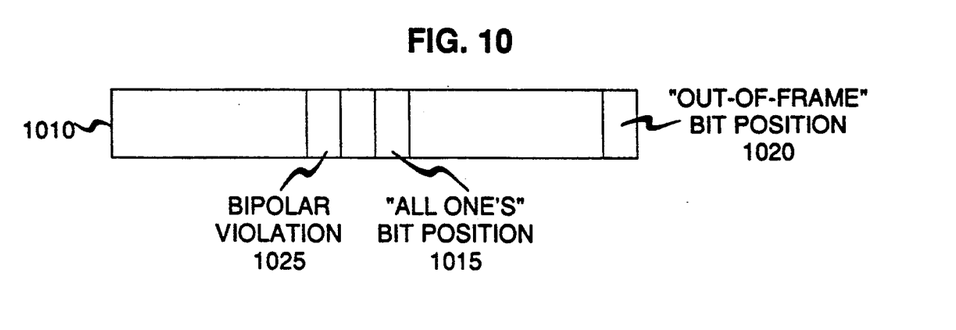
FIG. 10 shows the status register configuration of the interface unit of FIG. 5.

Store 447 of Line interface 305-1 also includes a status register wherein framing error and data error conditions are stored. The interface status register 1010 shown in FIG. 10 includes an "all ones" indication bit position 1015 generated in response to all ones data in the T1 time division frame and an out-of-frame indication bit position 1020. For Fs framing, the out-of-frame error is generated responsive to bipolar violation rate in the T1 time division frame. Bipolar violation detector 457 detects the out-of-frame condition and causes bit position 1020 of status register 1010 to be set. When an out-of-frame error is detected in frame and data error detector 413 of FIG. 4, bit position 1020 is set to one. An "all ones" error condition in detector 413 causes bit position 1015 to be set to one. For Fe framing, the out-of-frame indication bit is generated in response to the cyclic redundancy code (CRC) error rate detected by frame and data error detector 413. This type of error detection is described in U.S. Pat. No. 4,397,020 issued to R. D. Howson, Aug. 2, 1983. The resulting out-of-frame error is sent to processor 444 of performance monitor 440 via interface 411, bus 430 and interface 442, and the out-of-frame indication bit in register 1010 is set.

Figure 11:
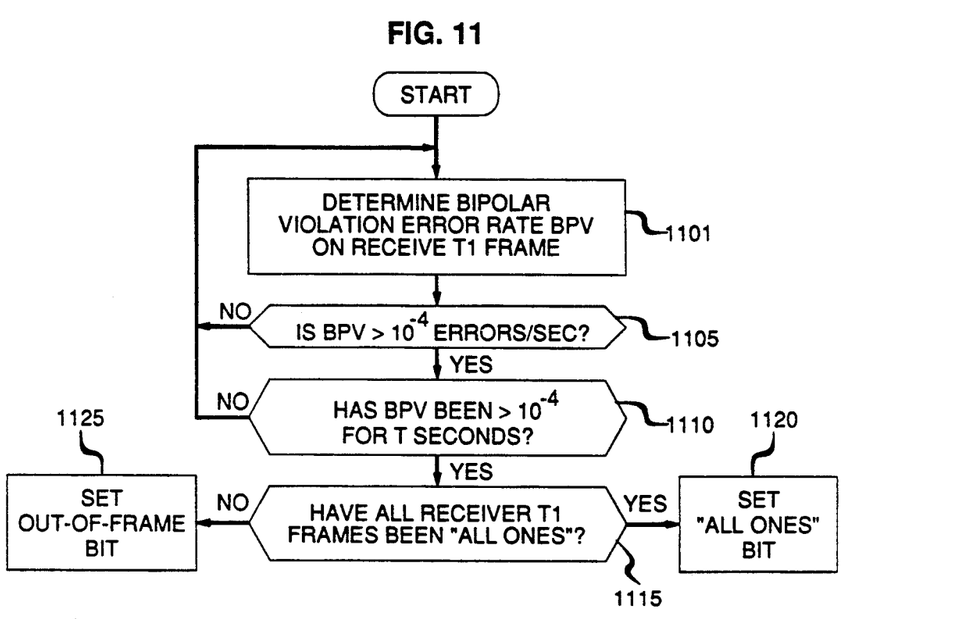
FIG. 11 is a flowchart illustrating the error detecting arrangements for Fs framing in the interface unit of FIG. 4.
Figure 12:
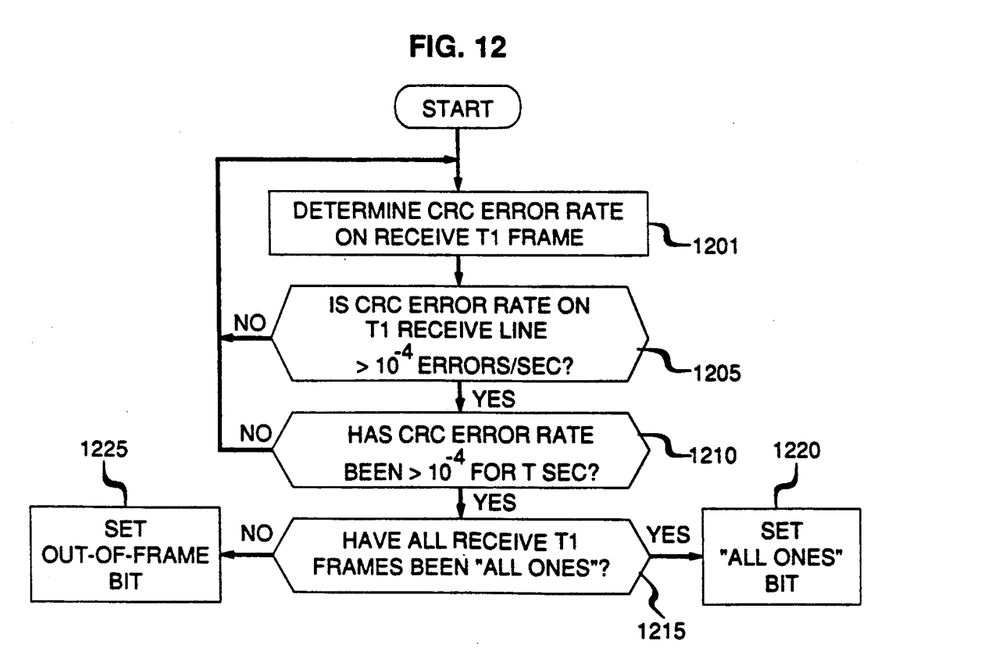
FIG. 12 is a flowchart illustrating the error detecting arrangements for Fe framing in the interface unit of FIG. 4.

The flowchart of FIG. 11 illustrates the out-of-frame error detection arrangements in the Fs framing configuration. Error detection is operative when the interface unit is in service. As per step 1101, the bipolar violation error rate is generated in bipolar violation detector 457. A BPV rate signal is sent to performance monitor 440 wherein the rate is compared to a preset standard such as $10^{-4}$ per second (step 1105). If BPV is less than the threshold, control is returned to step 1101. Otherwise, it is determined whether the threshold has been exceeded for T seconds, e.g., 2.5. If time period T is not exceeded, control is returned to step 1101 and monitoring of the bipolar violation rate continues in the loop from step 1101 to step 1110. In the event the bipolar violation rate exceeds the threshold for T seconds, step 1115 is entered wherein the all ones condition from frame and data error detector 413 is queried by performance monitor 440. Responsive to the all ones condition being detected, the all ones bit position of status register 1010 in store 447 is set (step 1120). In the absence of the all ones condition, the out-of-frame bit of register 1010 is set (step 1125). The error detection arrangement for Fe framing illustrated in FIG. 12 is similar except that CRC error rate is monitored in frame and data error detector 413 rather than bipolar violations to determine the out-of-frame and all ones error conditions.

Figure 13:
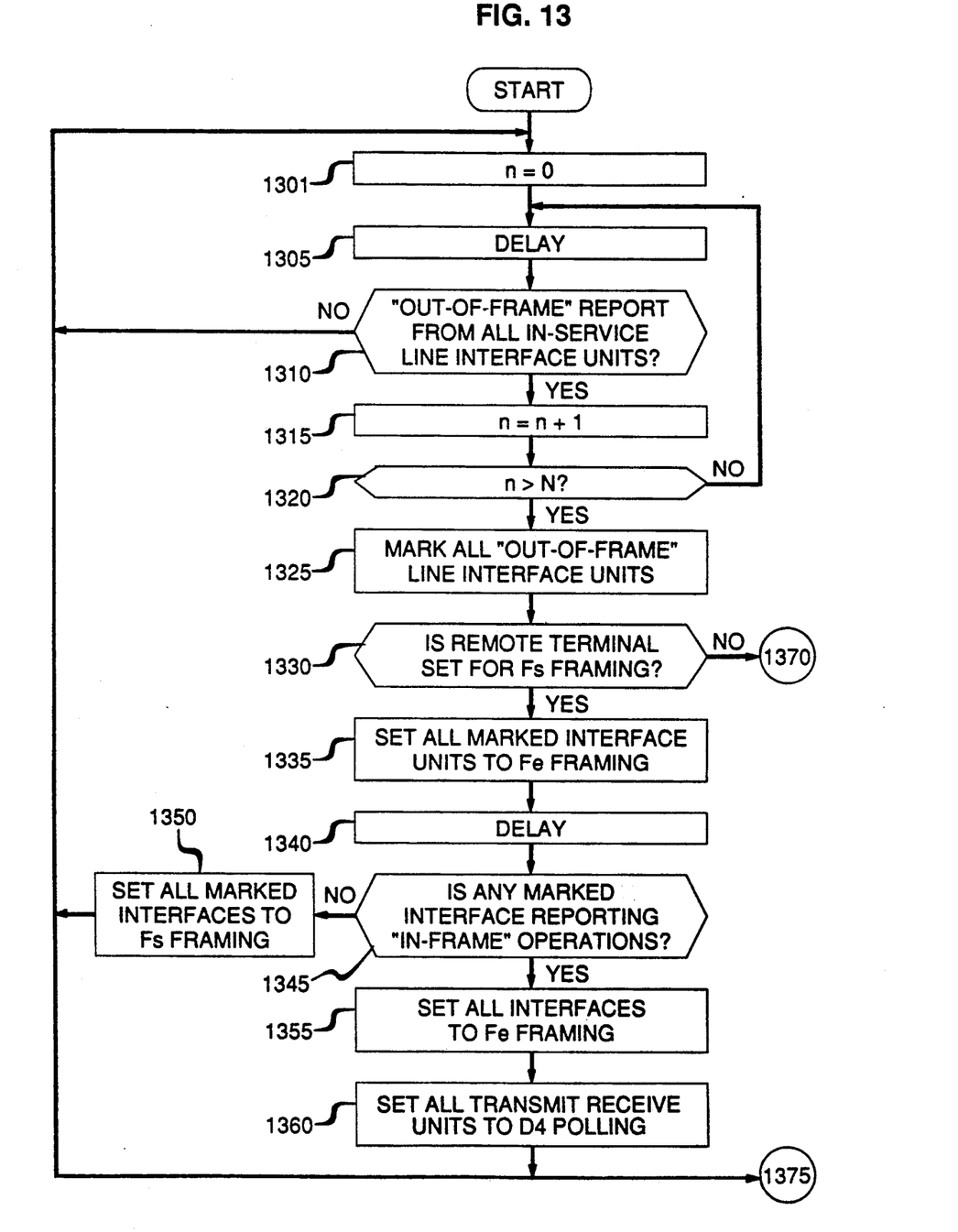
FIGS. 13 and 14 are flowcharts illustrating in more detail the operation of the frame change over arrangements in the remote terminal of FIG. 3.

The remote terminal of FIG. 3 can be adapted to use either Fs or Fe framing by changing the provisioning registers of the interface and transmit-receive units. Since all data is exchanged between the central office and the remote terminal over the time division link, a change from one frame configuration to the other frame configuration at the central office or at the remote terminal results in a disruption of all communication therebetween. In accordance with the invention, the remote terminal provisioning is modified to match the framing configuration of the central office without the need for manual alteration of the remote terminal. The automatic cut-over arrangement is controlled by controller 330 and is illustrated in the flowchart of FIG. 13. Instruction codes corresponding to the flowchart of FIG. 13 are stored in program store 635 of controller 330.

Referring to FIG. 13, the framing condition of the remote terminal is periodically monitored in the loop from step 1301 to step 1320. Out-of-frame count index n is initially set to zero in step 1301. After a delay (step 1305), controller 330 polls the performance monitor status registers of all in-service interfaces in the remote terminal to determine whether an out-of-frame condition has been reported. If any in-service interface, e.g., 305-1, reports in-frame operation in step 1310, index n is reset in step 1301 prior to reentry into delay step 1305. If all in-service interfaces report out-of-frame operation, out-of-frame index n is incremented (step 1315) and control is returned to delay step 1305 via decision step 1320. When n is greater than a prescribed number N, step 1325 is entered wherein the store of controller 330 identifies all out-of-frame in service interface units.

Control is then passed to step 1330 in which store 620 of controller 330 is queried to determine whether the remote terminal frame configuration is set to Fs framing. If Fs framing is set, the sequence of steps from step 1335 to 1360 is performed. All interfaces marked as out-of-frame are reprovisioned for Fe framing (step 1335). To do this, controller 330 sends provisioning signals to the status registers of the identified interface units, e.g., 305-1. These provisioning signals change the framing bit 805 and the polling bit 803 of interface provisioning register 801. A delay period (step 1340) is initiated to allow the framing changes to take effect in the marked interfaces. After the delay, the marked interfaces are polled by controller 330 to determine if at least one is reporting in-frame operation (step 1345). In the event any of the marked interfaces report in-frame operation in step 1345, controller 330 sends Fe frame provisioning signals to all interfaces (step 1355) and sends D4 polling signals to the all transmit-receive units (step 1360). Where no marked interface reports in-frame operation, all marked interfaces are reprovisioned for Fs framing (step 1350). Other alarm mechanisms in the operation of controller 330 are then relied upon for appropriate action.

Figure 14:
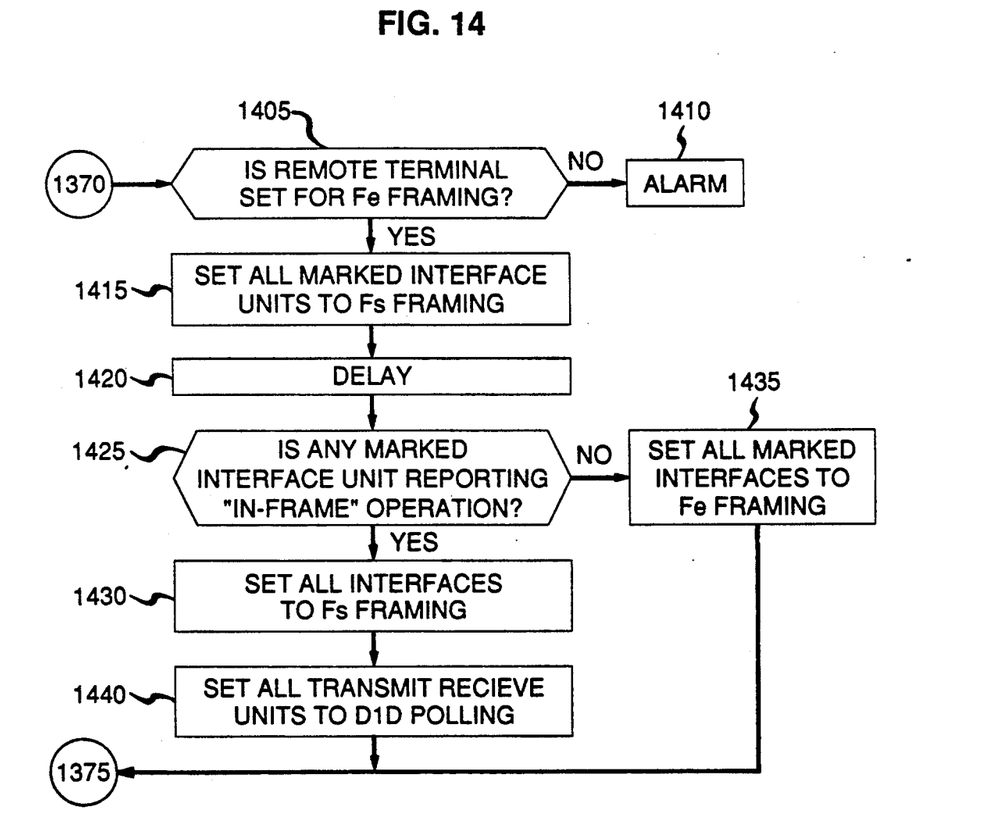

If it is determined in step 1330 that the remote terminal is set for Fe framing, step 1405 is entered via 1370 wherein the controller store is queried as to whether the remote terminal is set to Fe framing. An absence of Fe framing, causes an alarm to be set in step 1410. Where Fe framing is found, control is switched to the sequence from step 1415 to step 1440. This sequence is similar to the sequence from step 1335 to step 1360. In step 1415, all interfaces marked as out-of-frame are reprovisioned for Fs framing. To do this, controller 330 sends provisioning signals to the status registers of the identified interface units, e.g., 305-1. These provisioning signals change the framing bit 805 and the polling bit 803 if interface provisioning register 801. A delay period (step 1420) is then entered to allow the framing changes to take effect in the marked interfaces. After the delay, the marked interfaces are polled by controller 330 to determine if at least one is reporting in-frame operation (step 1425). In the event any of the marked interfaces report in-frame operation in step 1425, controller 330 sends Fs frame provisioning signals to at least the unmarked interfaces or to all interfaces (step 1430) and sends D1D polling signals to the transmit-receive units (step 1440). When no marked interface reports in-frame operation, all marked interfaces are reprovisioned for Fe framing (step 1435). Other alarm mechanisms in the operation of controller 330 are then relied upon for appropriate action.

The invention has been described with reference to illustrative embodiments thereof. It is apparent, however, that various modifications and changes may be made by one skilled in the art without departing from the spirit and scope of the invention.

I claim:

1. A frame organized time division multiplex communication system comprising:

a plurality of terminals; and
at least one time division multiplex link interconnecting said terminals for exchanging signals between terminals in time division multiplex frames,
each terminal comprising
a plurality of interfaces connected to said time division multiplex link for multiplexing signals applied to said time division multiplex link in a prescribed time division frame and for demultiplexing signals received from said time division multiplex link in said prescribed time division frame,
means for determining the time division frame configuration of said interfaces,
means for monitoring in-frame and out-of-frame operating condition of said interfaces, and
means for controlling said interfaces of the terminal including
means for receiving out-of-frame signals from said monitoring means of said interfaces,
means responsive to said received out-of-frame signals from said monitoring means of said interfaces for generating a signal marking said interfaces as out-of-frame, and
means responsive to said marked out-of-frame interfaces for switching said terminal interfaces to another frame configuration.

2. A frame organized time division multiplex communication system comprising:

a central office,
at least one remote terminal, and
a time division multiplex link connected between each remote terminal and the central office for carrying signals organized in time division multiplex frames between the central office and the remote terminals,
each remote terminal comprising
a plurality of interfaces connected to said time division multiplex link each including
means connected to said time division multiplex link for multiplexing signals to be applied to said time division multiplex link into said time division multiplex frames and for demultiplexing signals organized into said time division frames received from said time division multiplex link,
means for determining the time division frame configuration of the interface, and
means responsive to the signals of successive time division frames from said time division multiplex link for monitoring in-frame and out-of-frame operating conditions of the interface, and
means connected to the interfaces of the remote terminal for controlling said interfaces including means for selecting said frame configuration of the interface multiplexing and demultiplexing means,
said interface controlling means including
means for receiving out-of-frame signals from said monitoring means of said interfaces,
means responsive to said received out-of-frame signals from said monitoring means of said interfaces for generating a signal marking said interfaces as out-of-frame, and
means responsive to said marked out-of-frame interfaces for switching said marked interfaces to an alternate frame configuration.

3. A frame organized time division multiplex communication system according to claim 2 wherein
each interface time division frame monitoring means comprises means for detecting the error rate in the sequence of time division frames from said time division multiplex link, and means responsive to said detected error rate exceeding a predetermined threshold for generating the out-of-frame operation signal.

4. A frame organized time division multiplex communication system according to claim 2 wherein the means responsive to the marked out-of-frame interfaces for switching said marked interfaces to an alternate frame configuration comprises means responsive to the generated out-of-frame signals for forming a signal corresponding to said alternate frame configuration, and means for transferring the alternate frame configuration signal to the frame configuration determining means of said marked interfaces.

5. A frame organized time division multiplex communication system according to claim 4 further comprising means for generating a signal identifying the transfer of said alternate framing configuration signal to said marked interfaces, and means jointly responsive to said alternate frame configuration identifying signal and an in-frame operating condition signal from at least one of the marked interface monitoring means for transferring the alternate frame configuration signals to the unmarked interfaces of the remote terminal.

6. A frame organized time division multiplex subscriber loop communication system comprising:

a central office, at least one remote terminal serving a plurality of subscribers, at least one time division multiplex link connected between each remote terminal and the central office for exchanging signals organized into prescribed time division multiplex frames between the central office and the remote terminal, and means at the central office for setting the frame configuration of said time division multiplex link connected to said remote terminal, each remote terminal comprising a plurality of interfaces connected between said time division multiplex link and one group of the plurality of subscribers each interface including means connected to said time division multiplex link for multiplexing signals from the group of subscribers onto said time division frames and for demultiplexing signals received from said time division multiplex link in time division frames and distributing said demultiplexed signals to said one group of subscribers, means for determining said time division multiplex frame configuration of said interface, and means responsive to the signals of successive time division frames from said time division multiplex link for monitoring the in-frame and out-of-frame operating condition of said interface, and means for controlling said interfaces of the remote terminal including means for selecting the frame configuration of said interfaces multiplexing and demultiplexing, said interface controlling means including means responsive to the monitored operating condition of each interface for marking interfaces exhibiting out-of-frame operation, means responsive to said marked out-of-frame interfaces for switching said marked interfaces to an alternate frame configuration, and means responsive to at least one of the alternate frame configuration interfaces exhibiting in-frame operation for switching unmarked interfaces of the remote terminal to the alternate frame configuration.

7. In a frame organized time division multiplex communication system having a plurality of terminals and at least one time division multiplex link interconnecting the terminals for exchanging signals organized in time division multiplex frames therebetween, each terminal having a plurality of interfaces for multiplexing signals applied to said time division multiplex link in prescribed time division frames, for demultiplexing signals from said time division multiplex link in said prescribed time division frames and for establishing the current frame configuration of the interfaces, and an interface controller, a method for altering the frame configuration of a terminal comprising the steps of:

monitoring the in-frame and out-of-frame operating condition of said terminal interfaces responsive to the signals of the successive time division frames received from said time division multiplex link, receiving out-of-frame operation signals from said interfaces, generating a signal marking said interfaces as out-of-frame, and switching said marked out-of-frame interfaces from the current frame configuration to an alternate frame configuration.

8. In a frame organized time division multiplex communication system comprising a central office, at least one remote terminal, and a time division multiplex link connected between each remote terminal and the central office carrying signals organized in time division multiplex frames between the central office and the remote terminals, each remote terminal including a plurality of interfaces connected to the time division multiplex link for multiplexing signals into the time division multiplex frames and demultiplexing signals from the time division multiplex frames, and means for establishing the current frame configuration of the interface multiplexing and demultiplexing, a method for altering the frame configuration of a terminal comprising the steps of:

monitoring the in-frame and out-of-frame operating condition of the interfaces responsive to signals of the successive time division frames received by each interface of the terminal from the time division multiplex link, receiving out-of-frame operation signals from the interfaces, generating a signal marking the interfaces as out-of-frame, and switching at least the marked interfaces from the current frame configuration to an alternate frame configuration responsive to the identified out-of-frame interfaces.

9. In a frame organized time division multiplex communication system comprising a central office, at least one remote terminal, and a time division multiplex link connected between each remote terminal and the central office carrying signals organized in time division multiplex frames, each remote terminal including a plurality of interfaces connected to the time division multiplex link for multiplexing signals into the time division multiplex frames and demultiplexing signals from the time division multiplex frames, and means for establishing the current frame configuration of the interface multiplexing and demultiplexing, the method for altering the frame configuration of a terminal according to claim 8 wherein the in-frame and out-of-frame operating condition monitoring comprises determining the error rate in the sequence of time division frames received from the time division multiplex link, and generating an out-of-frame operation signal responsive to the error rate exceeding a predetermined number.

10. In a frame organized time division multiplex communication system comprising a central office, at least one remote terminal, and a time division multiplex link connected between each remote terminal and the central office carrying signals organized in time division multiplex frames, each remote terminal including a plurality of interfaces connected to the time division multiplex link for multiplexing signals into the time division multiplex frames and demultiplexing signals from the time division multiplex frames, and means for establishing the current frame configuration of the interface multiplexing and demultiplexing, the method for altering the frame configuration of a terminal according to claim 9 wherein the step of switching the marked interfaces to an alternate frame configuration comprises generating a signal corresponding to the alternate frame configuration responsive to the out-of-frame operation signals, and transferring the alternate frame configuration signals to the marked interfaces.

11. In a frame organized time division multiplex communication system comprising a central office, at least one remote terminal, and a time division multiplex link connected between each remote terminal and the central office carrying signals organized in time division multiplex frames, each remote terminal including a plurality of interfaces connected to the time division link the time division multiplex link for multiplexing signals into the time division multiplex frames and demultiplexing signals from the time division multiplex frames, and means for establishing the current frame configuration of the interface multiplexing and demultiplexing, the method for altering the frame configuration of a terminal according to claim 10 further comprising the steps of:

generating a signal identifying the transfer of the alternate framing configuration signal to the marked interfaces, and transferring the alternate frame configuration signals to the unmarked interfaces of the remote terminal jointly responsive to the alternate frame configuration identifying signal and an in-frame operation signal from at least one of the marked interfaces.

12. A circuit for controlling the time division frame configuration of a plurality of time division interfaces of a remote terminal connected to a time division multiplex link in a digital loop multiplex communication system comprising:

means responsive to the signals of successive time division frames received from the time division multiplex link by each time division interface for periodically determining the frame error rate of the time division interface, means responsive to the interface frame error rate exceeding a predetermined threshold for generating a signal marking the interface as exhibiting out-of-frame operation with respect to the current frame configuration, and means responsive to the marked interfaces exhibiting out-of-frame operation for switching the marked interfaces from the current frame configuration to an alternate frame configuration.

13. A circuit for controlling the time division frame configuration of a plurality of time division interfaces of a remote terminal connected to a time division multiplex link in a digital loop multiplex communication system according to claim 12 further comprising means responsive to at least one of the marked interfaces switched to the alternate frame configuration having a frame error rate reduced below the predetermined threshold for switching the unmarked interfaces of the terminal to the alternate frame configuration.

14. A circuit for controlling the time division frame configuration of a plurality of time division interfaces of a remote terminal connected to a time division multiplex link in a digital loop multiplex communication system according to claim 13 further comprising means responsive to the frame error rate of all marked interfaces switched to the alternate frame configuration exceeding the predetermined threshold for switching the marked interfaces back to the current frame configuration.

15. A method for controlling the time division frame configuration of a plurality of time division interfaces of a remote terminal connected to a time division multiplex link in a digital loop multiplex communication system comprising the steps of:

periodically determining the frame error rate of said time division interfaces responsive to signals of successive time division frames received from said time division multiplex link by each time division interface, generating a signal marking the interfaces as exhibiting out-of-frame operation with respect to the current frame configuration responsive to the interface error rate exceeding a predetermined threshold, and switching said marked interfaces from said current frame configuration to an alternate frame configuration responsive to said marked interfaces exhibiting out-of-frame operation.

16. A method for controlling the time division frame configuration of a plurality of time division interfaces of a remote terminal connected to a time division multiplex link in a digital loop multiplex communication system according to claim 15 further comprising the step of switching the unmarked interfaces of the terminal to said alternate frame configuration responsive to at least one of said marked interfaces switched to the alternate frame configuration having a frame error rate reduced below the predetermined threshold.

17. A method for controlling the time division frame configuration of a plurality of time division interfaces of a remote terminal connected to a time division multiplex link in a digital loop multiplex communication system according to claim 16 further comprising said step of switching said marked interfaces back to the current frame configuration responsive to the frame error rate of all marked interfaces switched to the alternate frame configuration exceeding the predetermined threshold.

* * * * *